Figure 1:
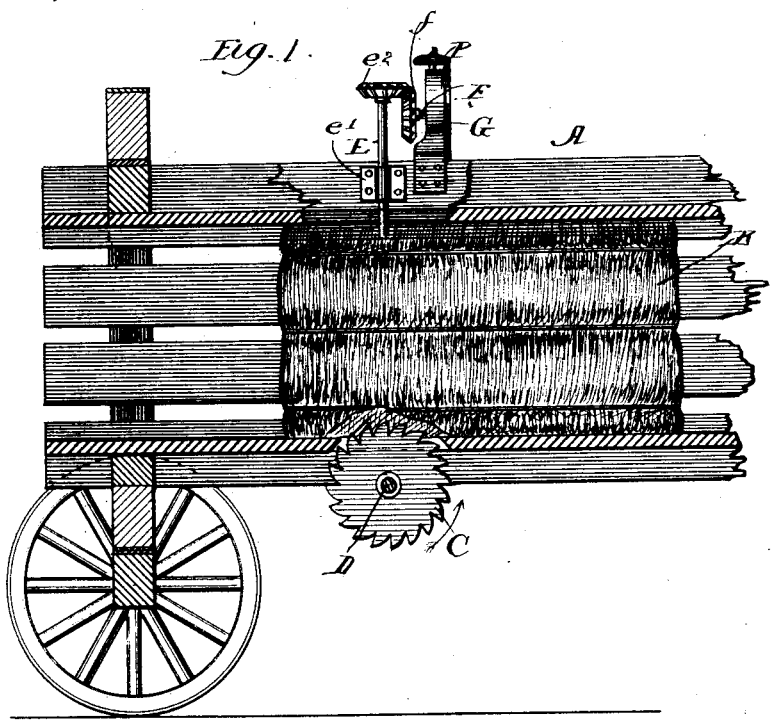

(No Model.) 2 Sheets—Sheet 1.

A. WICKEY.
BALING PRESS.

No. 512,782. Patented Jan. 16, 1894.

Witnesses:
Charles Q. Thewey
O. P. Smith

Inventor:
Andrew Wickey
By Wiles, Garnee & Bitner
Attorneys.

(No Model.) 2 Sheets—Sheet 2.
A. WICKEY.
BALING PRESS.
No. 512,782. Patented Jan. 16, 1894.
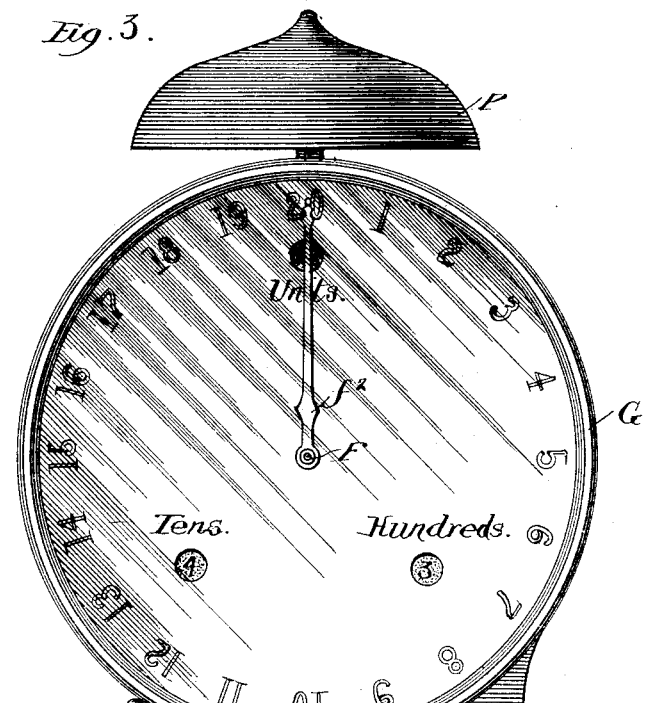
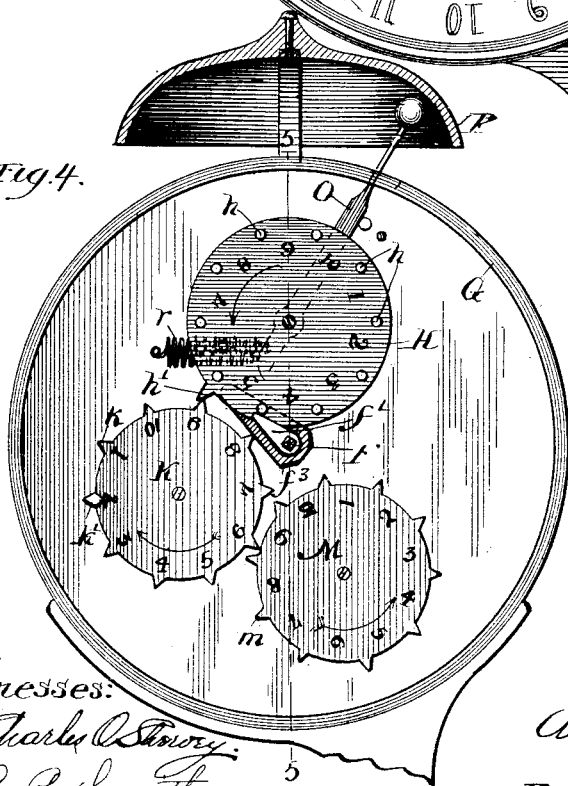
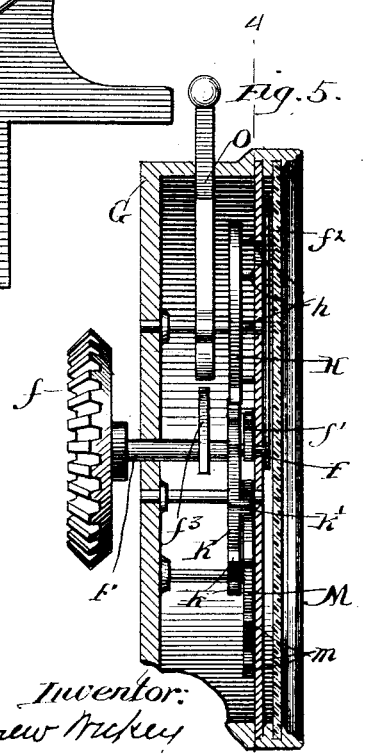
Witnesses:
Charles O. Storey
C. P. Smith
Inventor:
Andrew Wickey
By Wiles, Merwin & Bitner
Attorneys.

UNITED STATES PATENT OFFICE.

ANDREW WICKEY, OF CHICAGO, ILLINOIS.

BALING-PRESS.

SPECIFICATION forming part of Letters Patent No. 512,782, dated January 16, 1894.

Application filed April 27, 1891. Serial No. 390,547. (No model.)

*To all whom it may concern:*

Be it known that I, ANDREW WICKEY, a citizen of the United States of America, residing at Chicago, in the county of Cook and State of Illinois, have invented certain new and useful Improvements in Baling-Presses, of which the following is a specification.

In the operation of a baling press, the feeder is often put to considerable trouble because of his inability to tell without leaving his position, how nearly the last bale in the machine is completed.

My invention relates to a device which shall relieve him of this inconvenience, and which shall have the additional advantage of placing before his eyes in a convenient position, a permanent record of the number of bales formed and delivered from the machine. The different devices by means of which I accomplish these purposes will be clearly understood from the following description; and the essential features thereof I shall point out in the appended claim.

My improvements are illustrated by means of five figures in the drawings, of which—

Figure 2:
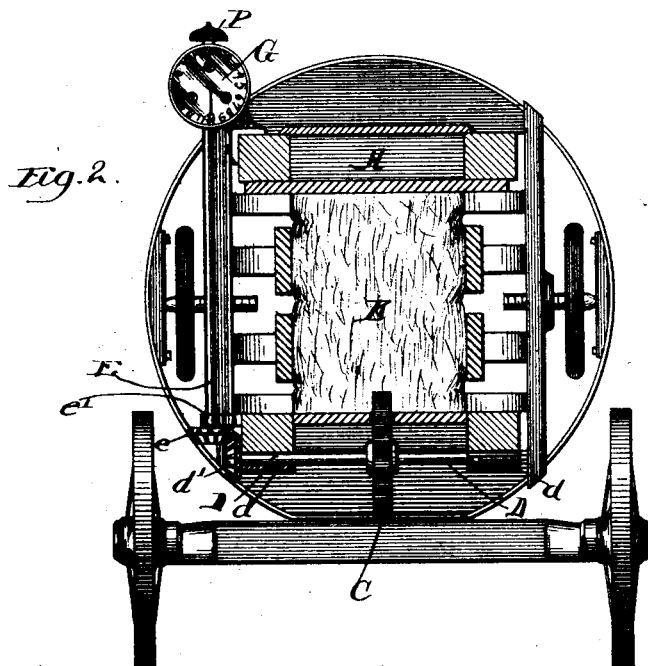

Figures 1 and 2 are longitudinal and transverse sections respectively, of a baling press having said improvements attached; and Figs. 3, 4 and 5 are respectively a front view, a flat section, and a transverse section of an indicating register, the application of which will appear below.

The sectional plane of Fig. 4 is indicated by the dotted line 4—4 of Fig. 5, and that of Fig. 5, by the dotted line 5—5 of Fig. 4.

The reference letter A is applied to the frame of the press, and B, to a completed bale, on its way through the press.

In what are known as continuous bale chambers, the progress in the formation of each bale can be accurately measured by the movement of the bales in front of the one in formation, and it is in this way that I propose to determine at all times the stage or size of the new bale.

To measure the movement of the hay as it passes through the press, I journal a shaft, D, in brackets, $d$, beneath the frame of the press, and secure upon said shaft a toothed wheel, C, extending upward through an opening in the bottom of the press and presenting its teeth above such bottom far enough to engage with the hay as it passes. While this is my preferred method of taking the movement of the bale, it is by no means the only one, and hence, I do not limit myself specifically thereto. A great many modifications might be devised, as, for instance, a toothed belt might be run over the bottom of the baling press which I should, of course, regard as the equivalent of my device. The location of the wheel is also immaterial, and is placed at the bottom merely as a matter of convenience.

Upon one end of the shaft, D, a miter wheel, $d'$, is keyed, and meshes with a corresponding miter, $e$, upon one end of a shaft, E, journaled in brackets, $e'$, upon the side of the press, and bearing at its top a miter gear, $e^2$.

An indicator, G, is secured to the top of the press, having its face turned toward the feeder and containing a central shaft, F, which carries a miter gear, $f$, in mesh with the gear, $e^2$. The central shaft, F, extends through the indicator and projects slightly beyond the face thereof, bearing upon the projecting portion a pointer, $f^2$.

The face of the dial is, as a matter of convenience, divided into parts, and each part numbered, so that the progress of the pointer around the dial may be easily read.

The gearing above described is so proportioned that the passage of one bale over the toothed wheel, C, will cause the pointer, $f^2$, to pass once around the dial, so that the position of said pointer at any moment will indicate the fraction of a bale which has been formed up to that moment. The face of the dial is cut away at three points, and back of the openings thus formed three wheels, H, K, M, are journaled, each bearing figures in proper position to be brought into view through said openings by the rotation of the wheel. The wheel, H, bears upon its face a series of pins, $h$, corresponding in number to the numbers upon the wheel; and the central shaft, F, has a crank arm, $f'$, adapted, by engagement with one of said pins, to advance the wheel, H, so as to increase the number in view by one, at each revolution of the pointer, $f^2$. Consequently, the number at any time in view through the upper hole in the dial will indicate up to a certain number, preferably ten, the number of revolutions which the pointer has made, and hence, the number of bales which have passed through the machine.

As it is sometimes necessary to preserve a permanent record beyond the limit of a single wheel, the wheels, K and M are provided, marked in the same manner as the wheel, H, the wheel, K, being adapted to record the revolutions of the wheel, H, and the wheel, M, those of the wheel, K. To do this the wheel, H, is provided upon its periphery with a single tooth, $h'$, and the wheel, K, with as many teeth, $k$, as it has numbers, so that at each revolution of the wheel, H, the tooth, $h$, will engage with one of the teeth, $k$, and advance the wheel, K, so as to bring the next larger figure in view through the lower left hand opening in the dial. The wheel, M, is also provided with teeth, $m$, upon its periphery, corresponding to the marks upon its face, and said wheel is placed a trifle in front of the wheel, K, so that the teeth, $k$, will not engage with the teeth, $m$; and the wheel, K, has one tooth, $k'$, extending outward from its face far enough to engage with one of the teeth, $m$, at each revolution of the wheel, K, and advance the wheel, M, one number.

It is obvious, of course, that the most convenient record is one which is kept upon the decimal system, so that the upper hole in the dial may show the units, the lower left hand one the tens, and the lower right hand one, the hundreds.

To notify the feeder of the completion of a bale, even when he neglects to look at the dial, I have provided a bell, P, and a striker, O, operated by a crank, $f^3$, upon the main shaft, F, and a spring, $r$, attached to the striker and to the frame of the indicator, so that at each revolution of the shaft, the striker is drawn back and then released, to allow the spring to throw it against the bell.

I claim as new and desire to secure by Letters Patent—

The combination with a baling press in which the hay enters the bale chamber at one end and is ejected at the other, of a device engaging through suitable connections with the moving hay and receiving therefrom a motion proportionate to that of the hay itself, and an indicator located in view of the feeder and having suitable connections with the said device, whereby said indicator shows at all times the progress toward completion of the bale then in course of formation; substantially as described.

ANDREW WICKEY.

Witnesses:
C. P. SMITH,
CHAS. O. SHERVEY.